No. 802,001. PATENTED OCT. 17, 1905.
W. A. LORENZ.
HERMETIC CLOSURE FOR RECEPTACLES.
APPLICATION FILED FEB. 20, 1904.
2 SHEETS—SHEET 1.
Fig. 1
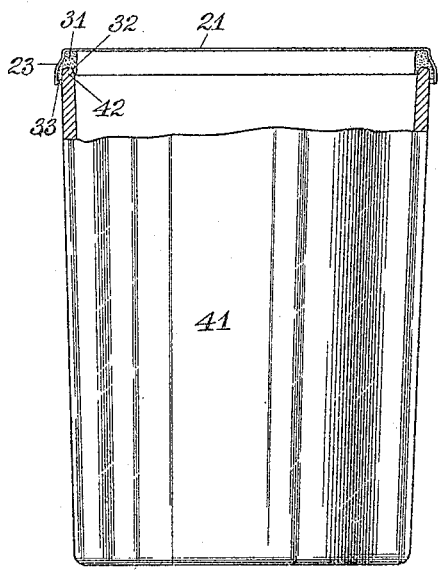
Fig. 2
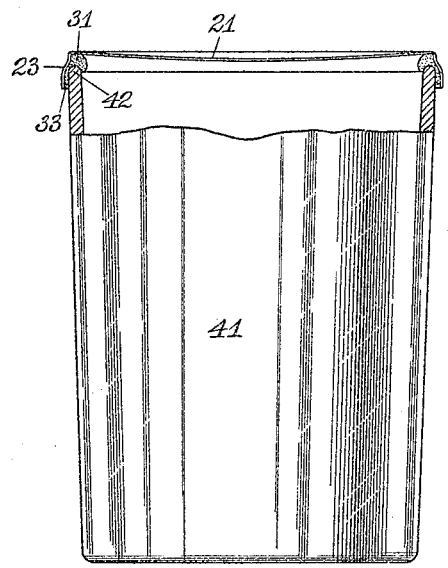
Fig. 3
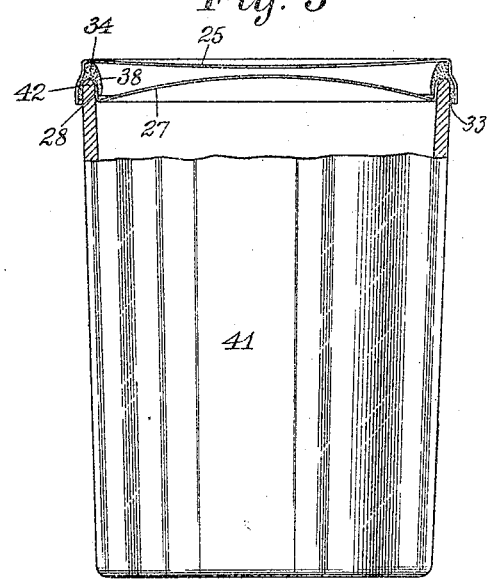
Fig. 1ª
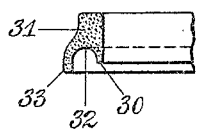
Fig. 7
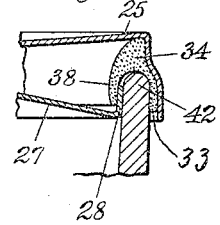
Witnesses:
H. Mallner
Jas. K. Green
Inventor
William A. Lorenz
By W. H. Houiss, Atty.

No. 802,001. PATENTED OCT. 17, 1905.
W. A. LORENZ.
HERMETIC CLOSURE FOR RECEPTACLES.
APPLICATION FILED FEB. 20, 1904.
2 SHEETS—SHEET 2.
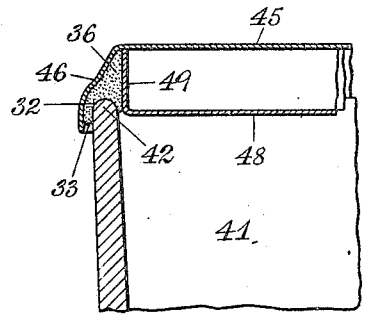
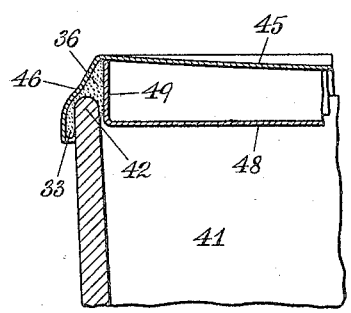
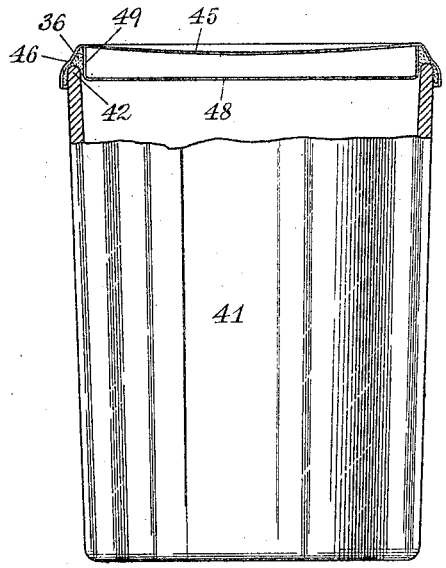
Witnesses:
H. Mallner
Jas. W. Green
Inventor
William A. Lorenz
By W. H. Honiss Atty.

UNITED STATES PATENT OFFICE.

WILLIAM A. LORENZ, OF HARTFORD, CONNECTICUT.

HERMETIC CLOSURE FOR RECEPTACLES.

No. 802,001. Specification of Letters Patent. Patented Oct. 17, 1905.

Application filed February 20, 1904. Serial No. 194,535.

*To all whom it may concern:*

Be it known that I, WILLIAM A. LORENZ, a citizen of the United States, and a resident of Hartford, in the county of Hartford and State of Connecticut, have invented certain new and useful Improvements in Hermetic Closures for Receptacles, of which the following is a full, clear, and exact specification.

This invention relates to improvements in closures for the hermetic sealing of tumblers and other plain-rimmed receptacles.

The closure-joint now commonly used for the hermetic sealing of jars and other receptacles is that in which the cap is of a flaring form where it engages with the sealing-gasket, the latter being supported upon a shoulder or in a groove provided for it below the level of the rim of the jar and upon the inner or outer surface thereof, according as an internal or external cap is to be used. In either case, however, the shoulder unfits the receptacle for many subsequent household uses which might be served by a tumbler or cup having a plain rim; but the difficulty of employing these plain-rimmed receptacles in connection with a flaring cap and gasket has been that they afford no means for receiving and maintaining the cap or gasket in correct position upon the rim of the receptacle during the sealing operation. In the present invention this difficulty is met by providing the gasket with a groove which fits the rim of the tumbler and performs the function of centralizing the cap with the tumbler, so that the gasket when pressed down by the cap cannot escape being pinched against a particular zone of the tumbler-rim. This form of gasket also establishes a level or parallel relation of the cap and gasket with that portion of the tumbler-rim on which the gasket is to be seated and compressed, which is an important feature in a closure of this character.

Although this invention may be adapted to the sealing of any suitable plain-rimmed receptacle, it is here shown as applied to the sealing of an ordinary glass tumbler as a good example of a receptacle well adapted to a variety of household uses after its original purpose as a sealed package has been served. The cap is shown with its flaring portion formed to compress and wedge the gasket upon an outer edge or zone of the rim of the tumbler.

Figures 1 and 2 of the drawings are side views in section of a tumbler, its gasket, and cap, Fig. 1, showing the parts in the position occupied by them during the air expelling or exhausting operation, while Fig. 2 shows the cap pushed down to its sealed position. Fig. 1ª is a fragmentary sectional side view, in enlarged scale, of the gasket 31. Fig. 3 is a side view in section of a tumbler with a modified form of gasket and cap and with an inner cover, the parts being shown in their sealed position. Figs. 4 and 5 are fragmentary side views, in enlarged scale corresponding to Figs. 1 and 2 and show a further modification of the cap and gasket and a modified form of the inner cover. Fig. 6 is a side view of a sealed tumbler provided with the same gasket, cap, and cover as those shown in Figs. 4 and 5. Fig. 7 is a fragmentary side view in section, on enlarged scale, of the gasket, cap, and inner cover.

In the preferred embodiment of this invention (shown in Figs. 1 and 2) the gasket 31 is provided with a groove or recess 32 in its under side, which may coincide substantially with the rounded rim 42 of the tumbler 41 and serves to centralize itself and the cap 21 upon the tumbler in proper relation to the sealing-seat. The outer side of the gasket is provided with a projecting edge 33, which extends a short distance below the edge of the tumbler-rim 42 and between that edge and the cap. The inner side of the gasket is also provided with a projecting edge 30, which may or may not extend as far down as the edge 33. The flaring cap 21, which is preferably flexible, is supported upon the gasket, the flaring portion 23 resting against the projection 33 of the gasket and serving, when pressed down, to compress the latter upon the outer rim of the tumbler and wedge it against that rim, as shown in Fig. 2.

In the modification shown in Fig. 3 and in Fig. 7 an inner cover 27 is provided to keep the contents of the jar from contact with the outer cap 25 and with the gasket. The inner cover 27 has an upwardly-extending flange 28, which is made a little smaller than the inside of the tumbler 41. The gasket 34 is provided with a projecting edge 38 on the inside in addition to the projecting edge 33 on the outside, and this edge 38 extends over and rests upon the flange 28 of the inner cover, thus effectually preventing the gasket from coming in contact with the contents of the tumbler.

In the modification shown in Figs. 4, 5, and 6 the inner cover 48 is provided with a flange 49, against which the inner side of the gasket 36 rests, the friction between the gasket and flange holding the cover 48 in place. This form of inner cover serves also as a support for the gasket against the inward wedging pressure of the flaring portion 46 of the cap 45 and increases to some extent the area of contact of the gasket over the rim 42, as shown in Figs. 5 and 6.

In my prior application, Serial No. 193,705, I have shown, described, and claimed a hermetic closure broadly similar to that shown in this application, in that it embodies the combination of a gasket and two separate caps provided with flexible flaring rims, one of said caps being inverted within the other cap, with the adjacent sides of their respective rims forming the upwardly-converging walls of a downwardly-facing annular groove for positioning the gasket in sealing relation to the outer edge of the receptacle-rim. My present application so far as it shows and relates to such devices does so for the purpose of claiming specific novel constructions and combinations of said devices and is a subordinate application to that above mentioned.

I claim as my invention—

1. The combination of a plain-rimmed receptacle, a gasket having an annular recess for supporting it upon the receptacle-rim, and having a projecting edge extending before compression outside of and below the sealing zone of the receptacle-rim, and a flaring cap extending over the said projecting edge of the gasket, and wedging it against the outer side of the rim.

2. The combination of a plain-rimmed receptacle, a gasket having an annular groove for supporting it upon the receptacle-rim, and having two projecting edges extending below the receptacle-rim, a flaring cap extending over and resting on the outer projecting edge of the gasket, and a separate gasket-support forming an inner cover for the receptacle.

3. The combination of a plain-rimmed receptacle, a gasket having an annular groove for supporting it upon the receptacle-rim, and having two projecting edges extending below the receptacle-rim, a flaring cap extending over and resting on the outer projecting edge of the gasket, and a separate inner cover having a flange projecting beneath the inner projecting edge of the gasket.

In testimony whereof I have signed my name to this specification in the presence of two subscribing witnesses.

WILLIAM A. LORENZ.

Witnesses:
H. MALLNER,
NELLIE PHOENIX.